(12) United States Patent
Fu (10) Patent No.: US 10,404,773 B2
(45) Date of Patent: Sep. 3, 2019

(54) DISTRIBUTED CLUSTER PROCESSING SYSTEM AND PACKET PROCESSING METHOD THEREOF

(71) Applicant: HUAWEI TECHNOLOGIES CO., LTD., Shenzhen (CN)

(72) Inventor: Tianfu Fu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1307 days.

(21) Appl. No.: 14/167,507

(22) Filed: Jan. 29, 2014

(65) Prior Publication Data

US 2014/0149549 A1    May 29, 2014

Related U.S. Application Data

(63) Continuation of application No. PCT/CN2012/079240, filed on Jul. 27, 2012.

(30) Foreign Application Priority Data

Aug. 10, 2011 (CN) .......................... 2011 1 0228672

(51) Int. Cl.
*H04L 29/08* (2006.01)
*H04L 12/46* (2006.01)
*H04L 12/44* (2006.01)

(52) U.S. Cl.
CPC .............. *H04L 67/02* (2013.01); *H04L 12/44* (2013.01); *H04L 12/462* (2013.01); *H04L 12/4633* (2013.01)

(58) Field of Classification Search
USPC ................................. 709/217–219, 225, 232
See application file for complete search history.

(56) References Cited

U.S. PATENT DOCUMENTS 6,393,026 B1 * 5/2002 Irwin ...................... H04L 45/00
                                                        370/394
7,287,180 B1 * 10/2007 Chen .................. G06F 11/2033
                                                         714/11
(Continued)

FOREIGN PATENT DOCUMENTS

CN      1410905 A      4/2003
CN      1423460 A      6/2003
(Continued)

OTHER PUBLICATIONS

Kronenberg, Nancy P., Henry M. Levy, and William D. Strecker. "VAXcluster: a closely-coupled distributed system." ACM Transactions on Computer Systems (TOCS) 4, No. 2 (1986): 130-146.*
(Continued)

*Primary Examiner* — Suraj M Joshi
*Assistant Examiner* — Melaku Y Habtemariam
(74) *Attorney, Agent, or Firm* — Staas & Halsey LLP (57) ABSTRACT

The present invention provides a distributed cluster processing system and a packet processing method thereof. The system includes at least one external interface unit, multiple processing units, and a switching unit, where each of the at least one external interface unit is connected between a corresponding processing unit of the multiple processing units and an external network element, and is configured to receive a packet from the external network element, forward the packet to a corresponding processing unit of the multiple directly connected processing units, and send a processed packet to the external network element; and each of the multiple processing units performs specified service processing and is respectively connected to the switching unit, so that the multiple processing units and the switching unit form a star topology structure. According to the system and the method, through a logical combination between the
(Continued)

processing units, end-to-end high performance may be achieved.

22 Claims, 7 Drawing Sheets

(56) References Cited

U.S. PATENT DOCUMENTS

| | | | |
|---|---|---|---|
| 7,324,515 B1 | 1/2008 | Chapman | |
| 8,706,965 B2 * | 4/2014 | Piry | G06F 9/52 711/118 |
| 2005/0038829 A1 * | 2/2005 | Chidambaran | G06F 17/30283 |
| 2005/0188021 A1 * | 8/2005 | Rohland | H04L 12/5875 709/206 |
| 2006/0088031 A1 | 4/2006 | Nalawade | |
| 2007/0121615 A1 * | 5/2007 | Weill | H04L 12/4633 370/389 |
| 2009/0292881 A1 * | 11/2009 | Sivaramakrishnan | G06F 12/0831 711/141 |
| 2011/0023090 A1 | 1/2011 | Asati et al. | |

FOREIGN PATENT DOCUMENTS

| | | |
|---|---|---|
| CN | 1719831 A | 1/2006 |
| CN | 101843048 A | 9/2010 |
| CN | 102291455 A | 12/2011 |
| EP | 1 501 247 A1 | 1/2005 |
| WO | 2009/026597 A1 | 3/2009 |

OTHER PUBLICATIONS

International Search Report dated Nov. 8, 2012 in corresponding International Patent Application No. PCT/CN2012/079240.
Chinese Office Action dated Apr. 3, 2013, in corresponding Chinese Patent Application No. 201110228672.4.
Extended European Search Report dated Jun. 3, 2014 in corresponding European Patent Application No. 12 82 2905.

* cited by examiner

DISTRIBUTED CLUSTER PROCESSING SYSTEM AND PACKET PROCESSING METHOD THEREOF

CROSS-REFERENCE TO RELATED APPLICATIONS

This application is a continuation of International Application No. PCT/CN2012/079240, filed on Jul. 27, 2012, which claims priority to Chinese Patent Application No. 201110228672.4, filed on Aug. 10, 2011, both of which are hereby incorporated by reference in their entireties.

TECHNICAL FIELD

The present invention relates to network technologies, and in particular, to a distributed cluster processing system and a packet processing method thereof.

BACKGROUND

In a conventional network topology, a stub network is the most complex, and computing resources are centralized in an enterprise. Recently, with the advent of cloud computing, large data centers, and the like, IT applications of an enterprise are gradually aggregated to form a super-large computing node. An existing network security product based on a single node cannot be deployed on a cloud computing center, a large data center, or an operator backbone network. In these cases, a requirement for performance, functionality, and reliability far exceeds a level of a conventional security product.

An operator is making transformation currently, that is, transforming from a single pipe to a smart pipe. During the transformation, the operator is required to smartly sense pipe content and smartly sense services, provide services for security, QoS (Quality of Service, quality of service), and value-added services, and based on data analysis, provide differentiated services for customers.

Under this background, a demand for technologies such as distributed processing and cluster processing is generated in the field of security and value-added services. By means of the distributed and cluster processing, multi-node stacking can be used to meet a demand of cloud computing, a data center, and an operator for security and value-added services, in a case that processing performance of a single node cannot be significantly improved.

Figure 1:
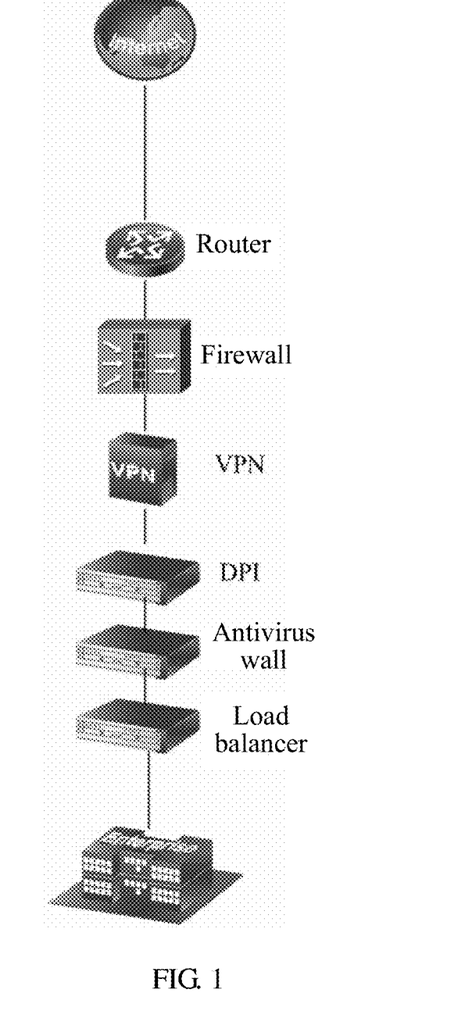
FIG. 1 is a schematic diagram of a security and value-added processing system using a serial processing technology in the prior art.

FIG. 1 is a schematic diagram of a security and value-added processing system using a serial processing technology in the prior art. As shown in FIG. 1, to meet requirements for performance and functionality at the same time, currently, in a node such as an operator network or a large data center, a single-function security product with superb performance is generally purchased and serially deployed at a network egress.

Since an egress bandwidth of an operator network or a large data center will reach hundreds of Gbps in a near future, a current solution is: both security and value-added service products use single-function products with high performance, and a structure shown in FIG. 1 is formed, where products such as a firewall, a VPN (Virtual Private Network, virtual private network), a DPI (Deep packet inspection, that is, deep packet inspection) device, a URL filtering (URL Filtering) device, an antivirus wall, and a load balancing device are connected in series.

This solution has the following problems:

1. A computing capability is wasted: In the field of security and value-added services, much processing work is repeated work. For example, almost each security and value-added service product has an abnormal packet detection mechanism and performs analysis on each packet. In a case of a series connection, processing is actually required only once. However, in fact, each product of each manufacturer performs abnormal packet detection, so that the abnormal packet detection is performed repeatedly in a system, resulting in waste of a large amount of computing resources and decreasing processing performance.

2. A network delay increases: Each packet is processed by all devices, and a node is added when a device is added, and correspondingly, a delay of end-to-end processing increases, thereby decreasing network performance.

3. Single points of failure increase: Since devices are connected in series, each device becomes a point with a single point of failure. In a case that an operator or a data center has a very high reliability requirement, this networking mode brings a huge hazard. Meanwhile, if solutions such as hot backup and primary backup are used, it is sure that system complexity sharply increases and an investment cost largely rises.

4. In a serial networking mode, processing performance of an entire system is determined by a node with the lowest processing capability. In the serial mode, generally, processing capabilities, such as antivirus and content security, of a device can merely reach ⅒ of a conventional network firewall.

Therefore, in the field of high-performance computing, especially in a case that a cloud computing era has an extremely harsh requirement for a capacity and security of the system, the serial mode is not suitable.

Another idea in the technical field is: in a case that a processing capability of a single device cannot be improved, a method of parallel load balancing may be used, where each node is fully configured with functions, and a load balancing device is used, so as to achieve end-to-end high performance.

Figure 2:
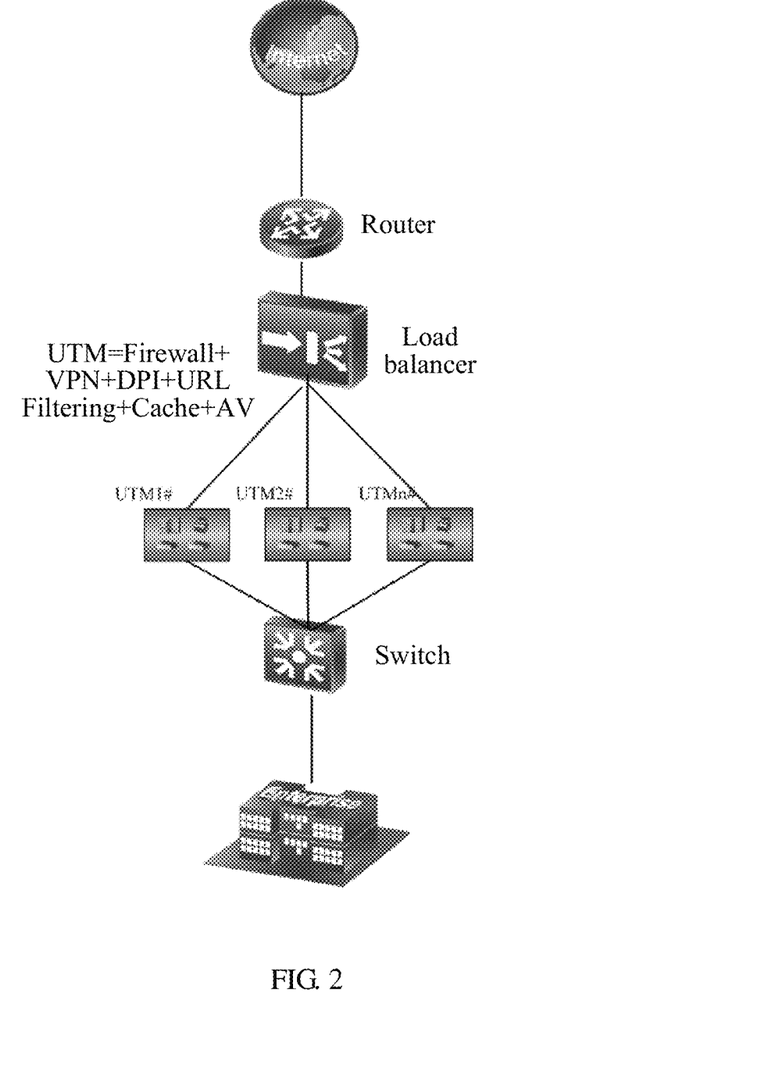
FIG. 2 is a schematic diagram of a security and value-added processing system using a load balancing technology in the prior art.

FIG. 2 is a schematic diagram of a security and value-added processing system using a load balancing technology in the prior art. In FIG. 2, each node is a device integrated with multiple security functions (generally referred to as unified threat management (UTM, Unified Threat Management) in the field). In this system, a load balancer is used to share traffic to each device.

This solution has the following problems:

1. Software complexity is too high: Since the load balancer cannot sense a service type, packet distribution can be merely based on traffic, and software functions of each node in load balancing are definitely required to be complete. This causes a serious problem, that is, when a device needs to implement many complex security and value-added service functions, performance, reliability and stability of the device sharply decrease. It is well known that, a characteristic of large software is that the more complex the software, the more difficult to achieve performance optimization and reliability optimization. Therefore, all functions are centralized on one device, but this architecture itself has defects. Therefore, this solution can merely meet a demand of low-end market, and cannot meet a requirement of a high-end product.

2. An upgrade is complex: An upgrade of each sub-function results in an upgrade of an entire system, which is not beneficial to smooth transition or capacity expansion.

3. Coupling of internal functions is strong: Since each device needs to implement all security and value-added service functions, functional modules are coupled to each other. Therefore, once a fault occurs, the entire system is affected. From a perspective of product engineering, it is difficult to achieve high quality and high reliability. For an application scenario of an operator and a data center, this solution is limited.

4. Function extension is difficult: Any UTM product cannot be fully configured with all security and value-added service functions. When a user needs to extend functions, it almost cannot be implemented on devices of one manufacturer, and a load balancing networking mode requires that each node should fully implement all functions, which is almost impossible in engineering.

Therefore, in the field, there is a demand for implementing high-performance processing, computing capability multiplexing and performance optimization, resilient network expansion, and flexible service deployment.

SUMMARY

For the foregoing problems in the prior art, the prevent invention provides a distributed cluster processing system and a packet processing method thereof, which may simultaneously implement high-performance processing, computing capability multiplexing and performance optimization, resilient network expansion, and flexible service deployment.

According to an aspect of an embodiment of the present invention, a distributed cluster processing system is provided and includes: at least one external interface unit, multiple processing units, and at least one switching unit, where:

each of the at least one external interface unit is connected between a corresponding processing unit of the multiple processing units and an external network element, and is configured to receive a packet from the external network element, forward the received packet to the processing unit directly connected to the external interface unit, and send a processed packet to the external network element;

each of the multiple processing units performs specified service processing and is respectively connected to the switching unit, so that the multiple processing units and the switching unit form a star topology structure, and each of the multiple processing units is configured to receive a packet from the switching unit or the packet from the directly connected external interface unit, process the packet, determine lower-level service processing and determine a lower-level processing unit according to a session processing policy, add a tag containing information about the lower-level processing unit in the processed packet and send the processed packet to the switching unit, and if it is determined that all processing on the packet has been completed, send the packet to one of the at least one external interface unit; and the switching unit is configured to receive packets from the multiple processing units, and forward, according to the tag containing the information about the lower-level processing unit and added in the received packets, the packets to a processing unit among the multiple processing units that is indicated by the information about the lower-level processing unit.

According to another implementation manner of the present invention, a packet processing method for a distributed cluster processing system is provided, and the distributed cluster processing system includes at least one external interface unit, multiple processing units, and at least one switching unit, where:

each of the at least one external interface unit is connected between a corresponding processing unit of the multiple processing units and an external network element;

each of the multiple processing units performs specified service processing and is respectively connected to the switching unit, so that the multiple processing units and the switching unit form a star topology structure; and the method includes the following steps:

a first step: receiving, by one of the at least one external interface unit, a packet from the external network element, and forwarding the packet to the processing unit directly connected to the external interface unit;

a second step: receiving, by one or more of the multiple processing units, a packet from the switching unit or the packet from the directly connected external interface unit, processing the packet, determining lower-level service processing and determining a lower-level processing unit according to a session processing policy, and if it is determined that all processing on the packet has been completed, sending the packet to one of the at least one external interface unit; otherwise, adding a tag containing information about the lower-level processing unit in the processed packet and sending the processed packet to the switching unit;

a third step: receiving, by the switching unit, a packet from each of the multiple processing units, and forwarding, according to the tag added in the received packet and containing the information about the lower-level processing unit, the packet to a processing unit among the multiple processing units that is indicated by the information about the lower-level processing unit; and a fourth step: receiving, by one of the at least one external interface unit, a packet from the directly connected processing unit, and forwarding the packet to the external network element.

According to the distributed cluster processing system and the packet processing method of the present invention, through a logical combination between the processing units, end-to-end high performance is achieved, thereby meeting a demand of an operator, cloud computing, and a large data center.

According to the distributed cluster processing system and the packet processing method of the present invention, a processing result (information such as an established flow table and an identified service) of an upper-level processing unit is delivered, together with a packet, to a lower-level processing unit through session table copying, and the lower-level processing unit merely needs to perform subsequent processing based on the preceding level, which can largely filter out packets not requiring processing, decrease packet throughput of a backward complex processing unit, improve efficiency, and avoid waste of computing resources.

According to the distributed cluster processing system and the packet processing method of the present invention, through dynamic registration and deregistration of the processing units, processing performance can be improved by increasing the number of processing units of a certain type during network upgrade and expansion according to network development planning of a user. Adding a processing unit type during service upgrade and expansion may realize a new service capability and implement flexible service upgrade and deployment.

BRIEF DESCRIPTION OF DRAWINGS

To describe the technical solutions of specific implementation manners of the present invention more clearly, the following briefly introduces accompanying drawings used in the specific implementation manners of the present invention. However, the following accompanying drawings show some embodiments of the present invention, and apparently, a person skilled in the art may still derive other implementation manners according to the accompanying drawings without creative efforts.

DESCRIPTION OF EMBODIMENTS

The following describes preferable implementation manners of the present invention with reference to accompanying drawings. However, a person skilled in the art should understand that the present invention may be implemented in different forms, and should not be interpreted as being limited to the embodiments described in the specification. More precisely, the embodiments are provided to make the specification clear and complete to a person skilled in the art and fully convey the scope of the present invention.

Figure 3:
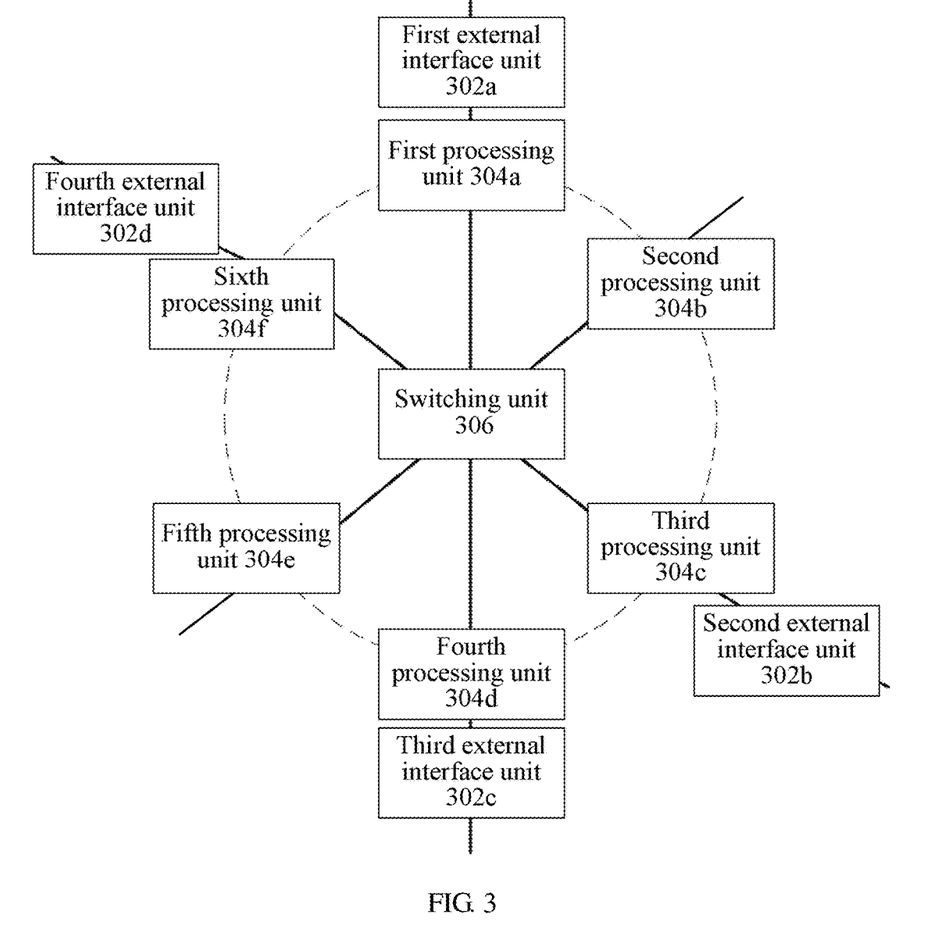
FIG. 3 is a topology structure of a distributed cluster processing system according to an implementation manner of the present invention.

FIG. 3 is a topology structure of a distributed cluster processing system according to an implementation manner of the present invention.

In FIG. 3, a distributed cluster processing system 300 includes a first external interface unit 302a, a second external interface unit 302b, a third external interface unit 302c, a fourth external interface unit 302d, a first processing unit 304a, a second processing unit 304b, a third processing unit 304c, a fourth processing unit 304d, and a switching unit 306. It should be noted that the number of external interface units and the number of processing units in FIG. 3 are merely examples, and the present invention is not limited thereto. The number of external interface units may be larger than or equal to 1, and the number of processing units may be larger than 1.

The external interface units 302a-302d are interfaces configured to connect the distributed cluster processing system 300 to another network element. In addition, each external interface unit is connected to the switching unit 306 through a corresponding processing unit. For example, the first interface unit 302a is connected to the switching unit 306 through the first processing unit 304a, the second interface unit 302b is connected to the switching unit 306 though the third processing unit 304c, the third interface unit 302c is connected to the switching unit 306 through the fourth processing unit 304d, and the fourth interface unit 302d is connected to the switching unit 306 though a sixth processing unit 304f. The distributed cluster processing system 300 may include one or more external interface units. The external interface units 302a-302d may be line processing units (LPU, Line Processing Unit) of a router and may also be gateway devices with a routing function.

Each processing unit is a processing unit of the distributed cluster processing system and completes specified dedicated service processing. The dedicated service processing may include security and value-added service processing. Each processing unit may be an independent server and may also be a board or a subboard of a router, or the like. The distributed cluster processing system 300 may include the multiple processing units 304a-304f.

Each of the processing units 304a-304f includes a first processing unit list, and the first processing unit list stores information about the valid processing units 304a-304f in the system and information such as a processing capability, quantity, and a load level of processing units of the same type. After packet processing is completed, the processing units 304a-304f determine a lower-level processing unit according to a session policy and the first processing unit list of the processing units 304a-304f.

In addition, when a processing unit, for example, 304a, determines to deliver a session to a lower-level processing unit, for example, 304b, for processing, the processing unit 304a first sends local session information about the processing unit 304a to the determined lower-level processing unit 304b; and when receiving the session information from the upper-level processing unit 304a, the lower-level processing unit 304b creates a local session table on the lower-level processing unit 304b according to the session information. By using the local session table, the processing unit 304b may know what kind of processing has been performed on the packet and does not need to perform the same processing at a current level.

The switching unit 306 is an aggregation center of all the processing units, and may be an independent switching chassis and may also be a switch fabric unit of a router. The switching unit 306 receives a packet from a processing unit, and forwards the packet to a lower-level processing unit according to a tag of a token contained in the packet and used to identify an identity of the lower-level processing unit (in the following, a token identifying an identity of a $k^{th}$ processing unit 304k is referred to as a token of the $k^{th}$ processing unit 304k for short).

In addition, when a new seventh processing unit 304g is added in the system, the newly added seventh processing unit 304g needs to register with the switching unit 306. The switching unit 306 allocates a token for the newly added seventh processing unit 304g, and broadcasts, after the registration is successful, information about the newly added processing unit node to all the other processing units 304a-304f.

In addition, the switching unit 306 periodically detects the processing units 304a-304f in the system. For example, when finding that a processing unit, for example, the fifth processing unit 304e, is disconnected, the switching unit 306 broadcasts information about the invalid processing unit 304e to other processing units 304a-304d and 304f, the other processing units 304a-304d and 304f update first processing unit lists of themselves and delete the invalid processing unit 304e from the first processing unit lists of themselves.

In addition, when the new seventh processing unit 304g is added in the system, if a function of the newly added seventh processing unit 304g is the same as that of an existing processing unit (for example, the second processing unit 304b) in the system, the switching unit 306 performs comprehensive analysis according to conditions such as a node processing capability, quantity, and a load level of processing units of the same type, determine a weight for each of such type of nodes, and provide related information for other processing units. Therefore, the switching unit 306 includes a second processing unit list, and the second processing unit list stores information about the valid processing units 304a-304g in the system and information such as a processing capability, quantity, and a load level of processing units of the same type.

In the distributed cluster processing system 300, each of the external interface units 302a-302d is connected to a corresponding one of the processing units 304a-304f, and each of the processing units 304a-304f is connected to the switching unit 306, forming a star topology structure. Each of the processing units 304a-304f or the external interface units 302a-302d and the switching unit 306 form a point-to-point connection. Each of the processing units 304a-304f exchanges data with other processing units merely through the switching unit 306. All the processing units 304a-304f register or deregister with the switching unit 306, and the switching unit 306 broadcasts a registration or deregistration event to other processing units.

The following describes a packet processing flow of the distributed cluster processing system 300 of the present invention.

In the distributed cluster processing system 300 of the present invention, processing on a packet in the system takes simple tag switching as a core. The so-called simple tag switching refers to that a tag is added in a packet before the packet is sent, and when the packet is received, it may be known where the packet should be sent by checking the tag carried in the packet. This is much simpler than checking a routing table, and is also simpler than tag switching of multi-protocol label switching MPLS (Multi-Protocol Label Switching), since the tag has a fixed length and carries no special information requiring processing. After completing the packet processing, one of the processing units 304a-304f searches for a session policy of the packet, determines, according to a first processing unit list stored by the one of the processing units 304a-304f, a lower-level processing unit (there may be one and may also be multiple lower-level processing units), adds session information and related information in the packet, and forwards the processed packet to the switching unit 306.

After a processing unit processes a function of the unit, the processing unit checks, according to a configured policy, whether subsequent processing on a session is required. For example, for a Telnet session, after firewall processing is completed, it may be determined that no subsequent processing is required. For example, the Telnet session definitely does not need to be sent to an antivirus processing unit. If no subsequent processing is required, routing information is searched for, an outbound interface is determined according to a destination address of the session, and a corresponding interface processing unit is found according to the outbound interface. A destination tag of the packet is a tag corresponding to the interface processing unit. The packet is sent back to the switching unit, and the switching unit may know that the packet is sent to an interface processing unit by checking the destination tag of the packet. If the subsequent processing is required, a tag of a lower-level processing unit is searched for according to a policy, the tag of the lower-level processing unit is added before the packet, the packet is sent to the switching unit, and the switching unit sends the packet to the lower-level processing unit according to the tag.

After receiving the packet, the switching unit 306 forwards the packet to each destination processing unit, that is, the lower-level processing unit. After completing related packet processing, each destination processing unit searches for a session processing policy, and judges what is a next procedure in which the session needs to be processed.

Figure 5:
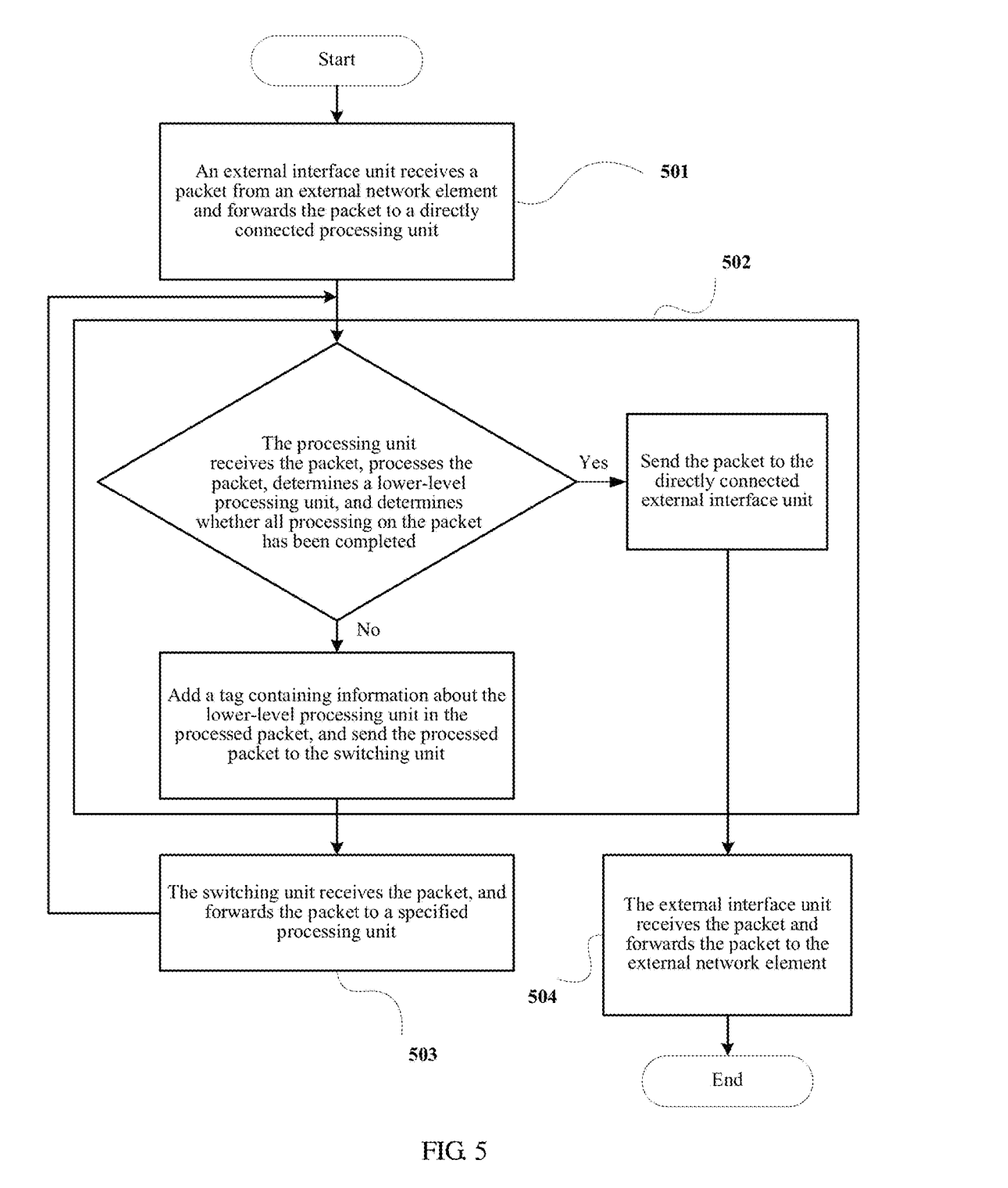
FIG. 5 is a flowchart of a packet processing method according to an implementation manner of the present invention.

Refer to FIG. 5, which describes a packet processing method in this embodiment of the present invention. The method includes:

Step 501: One of external interface units, for example, a first external interface unit 302a, receives a packet from an external network element and forwards the packet to a processing unit, for example, a first processing unit 304a, which is directly connected to the external interface unit 302a.

Step 502: The processing unit 304a receives a packet from a switching unit 306 or the packet received by the directly connected external interface unit 302a in step 501, processes the packet, determines lower-level service processing and determines a lower-level processing unit according to a session processing policy. If it is determined that all processing on the packet has been completed, the packet is sent to one of the at least one external interface unit; otherwise, a tag containing information about the lower-level processing unit is added in the processed packet, and the processed packet is sent to the switching unit.

Step 503: The switching unit receives a packet from each processing unit, and forwards the packet to the lower-level processing unit according to the tag containing the information about the lower-level processing unit and added in the received packet, where the lower-level processing unit is a processing unit specified by the information about the lower-level processing unit in an upper-level processing unit.

Step 504: One of the external interface units, for example, a second external interface unit 302b, receives a packet from the directly connected processing unit, and forwards the packet to the external network element.

Figure 4:
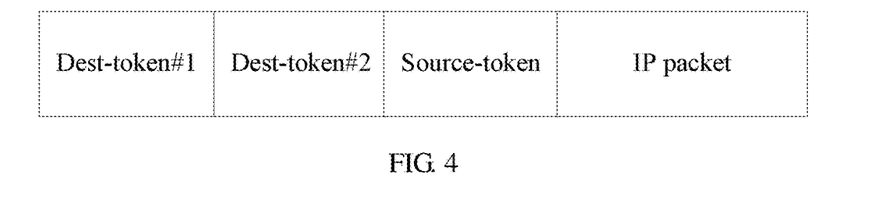
FIG. 4 is a packet structure according to an implementation manner of the present invention.

In step 502, when receiving the packet, the processing unit processes the packet, determines the lower-level processing unit according to the session policy and a first processing unit list, sends local session information to the second processing unit through the switching unit, adds a tag in the processed packet, and forwards the processed packet to the switching unit. Here, the tag includes a token (that is, a source token) of a current-level processing unit (for example, the first processing unit 304a) and a token (that is, a destination token) of the lower-level processing unit (for example, the second processing unit 304b). In addition, according to a requirement of the lower-level processing, there may be multiple destination tokens. FIG. 4 shows a structure of a packet added with a tag according an implementation manner of the present invention, where FIG. 4 shows that the tag includes two destination tokens Dest-token#1 and Dest-token#2 and a source token Source-token, but according to a requirement of the session processing, there may also be one, three, or more destination tokens.

The packet processing flow has two key procedures:

1. Session information copying: When determining to deliver a session to a lower-level processing unit for processing, the current-level processing unit first copies and sends its local session information to the lower-level processing unit. After receiving this message, the lower-level processing unit creates a local session table according to the session information.

Through session table copying, the lower-level processing unit does not need to process work that is processed at an upper level (for example, packet validity check and flow table establishment), thereby saving computing resources of the lower-level processing unit and improving end-to-end processing efficiency of an entire system.

Meanwhile, since the session information has a dependency relationship with a sequence, generally, when several preceding packets are processed, it cannot be judged which units need to perform processing subsequently (for example, when an SYN packet is received, it cannot be judged whether DPI (Deep Packet Inspection, deep packet inspection) or antivirus processing should be performed on the session). However, when it is found that the following processing unit needs to perform processing, the preceding packets have already been sent. At this time, the lower-level processing unit must know processed session information; otherwise, the lower-level processing unit cannot obtain information about the preceding packets and also cannot correctly process a subsequent event.

2. A hierarchical scheduling policy: After completing session processing, an upper-level processing unit decides a lower-level processing unit according to a service type and a preconfigured security and value-added service processing policy. If further processing is not required on the session, a packet is directly forwarded through a switching unit and a processing unit connected to a corresponding external interface unit; and if multiple processing units need to process the session simultaneously, the session table is copied to the multiple processing units, multicast replication is performed on the packet, and the packet is forwarded to the subsequent processing units.

Figure 6:
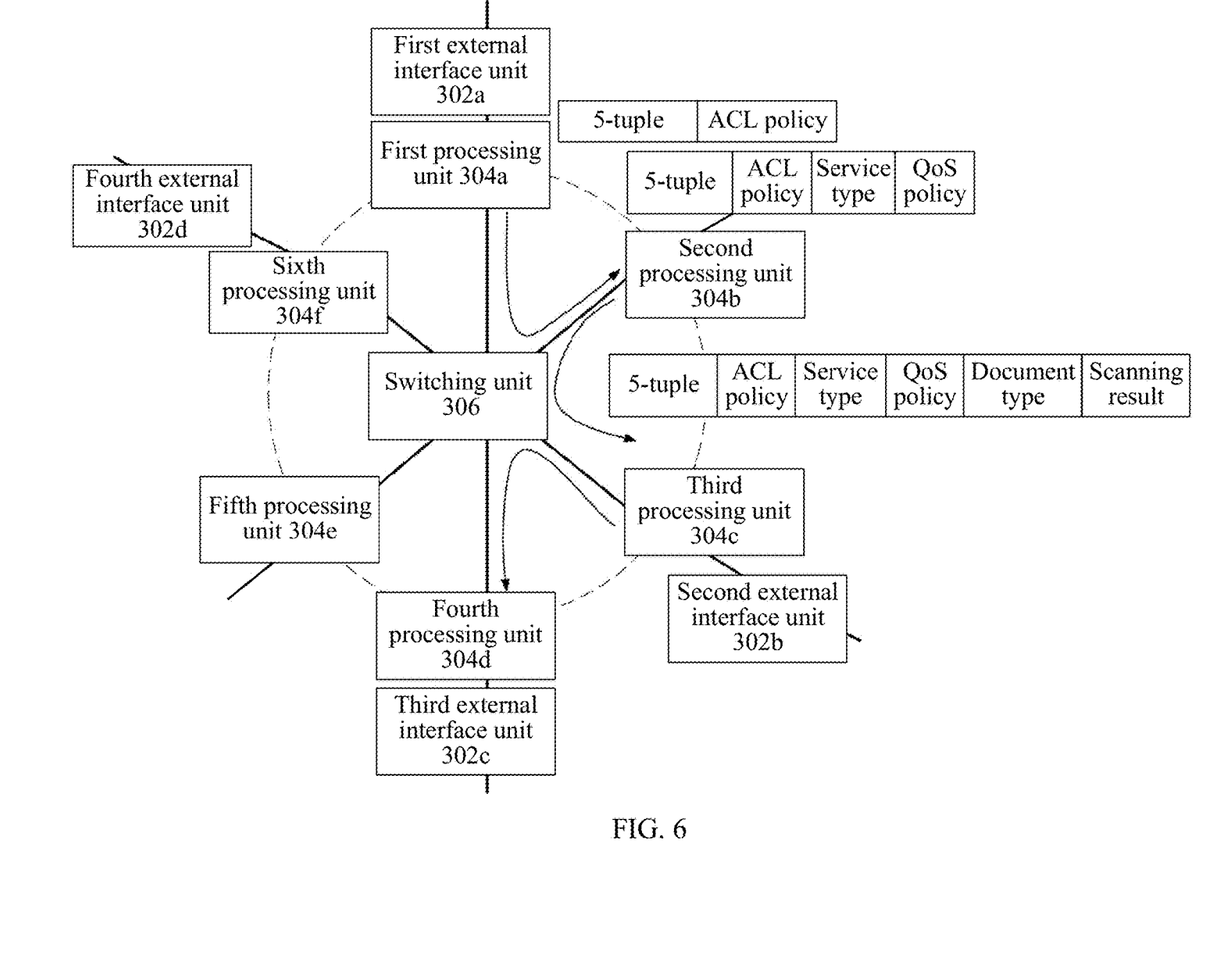
FIG. 6 is a schematic diagram of HTTP file download processing according to an implementation manner of the present invention.

The following, with reference to FIG. 5 and FIG. 6, further describes the session processing flow by using an HTTP file download session as an example. FIG. 6 is a schematic diagram of HTTP file download processing according to an implementation manner of the present invention. A case that a first processing unit 304a completes firewall processing, a second processing unit 304b completes DPI processing, and a third processing unit 304c completes antivirus processing is used as an example.

In step 501, the first external interface unit 302a receives a packet from the external network element and forwards the packet to the first processing unit 304a.

Then, in step 502, the first processing unit 304a receives the packet and performs the following operations: completing firewall processing on the received packet, establishing a flow table, searching for an ACL (access control list; Access Control List) access control policy, and establishing a session table, wherein, since the first processing unit 304a is an initial processing unit, in this case, the session table of the first processing unit 304a merely includes session processing information (establishing a flow table and searching for an ACL policy) of the first processing unit 304a; if permission is given after the processing and the DPI processing is required, searching for a first processing unit list stored in the first processing unit 304a, determining a token of the second processing unit 304b involved in a next procedure, adding a tag containing the token of the second processing unit 304b as a destination token and a tag containing a token of the first processing unit 304a as a source token in the processed packet; and forwarding the session table and the packet added with the tags to the switching unit 306.

Then, in step 503, the switching unit 306 receives the session table and the packet from the first processing unit 304a, checks information about the lower-level processing unit (that is, the second processing unit 304b) in the session table and the packet, and sends the session table of the first processing unit 304a and the packet to the second processing unit 304b. The processing flow returns to step 502.

In step 502, the second processing unit 304b receives the session table and the packet from the switching unit 306, and performs the following operations: checking the session table (containing information such as establishing a flow table and searching for an ACL policy) received from the first processing unit 304a; according to the received session table, determining that operations such as establishing a flow table and searching for an ACL policy do not need to be performed, so that the second processing unit 304b directly performs service type identification, searches for a QoS (Quality of Service, quality of service) policy according to the service type, and carries out the policy; establishing a local session table of the second processing unit 304b, and at this time, the local session table of the second processing unit 304b contains information such as establishing a flow table, searching for an ACL policy, service type identification, and a QoS policy; the second processing unit 304b checks whether a document type is infected with a virus, and if antivirus processing is required, determines that the lower-level processing is antivirus processing, searches for a first processing unit list of the second processing unit 304b, determines a token of the third processing unit 304c involved in a next antivirus processing procedure, adds a tag containing a token of the third processing unit 304c as a destination token and a tag containing a token of the second processing unit 304b as a source token in the processed packet; and forwarding the local session table of the second processing unit 304b and the packet added with the tags to the switching unit 306. The processing flow returns to step 503.

Then, in step 503, the switching unit 306 receives the session table and the packet from the second processing unit 304b, checks information about the lower-level processing unit (that is, the third processing unit 304c) in the session table and the packet, and sends the local session table and the packet of the second processing unit 304b to the third processing unit 304c. The processing flow returns to step 502.

Then, in step 502, the third processing unit 304c receives the session table and the packet from the switching unit 306, and performs the following operations: checking the session table received from the second processing unit 304b. The session table from the second processing unit 304b includes information such as establishing a flow table, searching for an ACL policy, service type identification, and a QoS policy. According to the received session table, the third processing unit 304c determines that it does not need to perform operations such as establishing a flow table, searching for an ACL policy, service type identification, and a QoS policy; therefore, the third processing unit 304c directly performs operations such as protocol reassembling of an application layer and antivirus processing; and establishes a local session table of the third processing unit 304c. At this time, the local session table of the third processing unit 304c includes information such as establishing a flow table, searching for an ACL policy, service type identification, a QoS policy, a document type, and a scanning result. The third processing unit 304c determines that all processing on the packet has been implemented, adds a tag containing a token of the fourth processing unit 304d as a destination token and a tag containing a token of the third processing unit 304c as a source token in the processed packet; and forwards the local session table of the third processing unit 304c and the packet added with the tags to the switching unit 306. Since after processing a function of the third processing unit 304c, the third processing unit 304c determines, according to a configured policy, that the session does not require a subsequent processing, then searches for routing information, determines an outbound interface of the session according to a destination address of the session, and finds, according to the outbound interface, the corresponding external interface unit, for example, the third external interface unit 302c. A destination tag of the packet is a tag corresponding to the third external interface unit 302c; the third processing unit 304c sends the packet back to the switching unit 306, the switching unit 306 knows that the packet is sent to the third external interface unit 302c by checking the destination tag of the packet; if a subsequent processing is required, the third external interface unit 302c finds a tag of a lower-level processing unit, adds the tag before the packet and sends the packet to the switching unit; and the switching unit sends the packet to the lower-level processing unit according to the tag. The processing flow again returns to step 503.

Then, in step 503, the switching unit 306 receives the session table and the packet from the third processing unit 304c, checks information about the lower-level processing unit in the session table and the packet, and finds, according to the tag in the packet, that the packet should be sent to the third external interface unit 302c through the fourth processing unit 304d, and the switching unit 306 sends the session table and the packet to the fourth processing unit 304d. The processing flow again returns to step 502.

In step 502, the fourth processing unit 304d checks the session table, determines that all processing on the packet has been completed, and forwards and routes the packet to an external interface unit corresponding to the route, that is, the third external interface unit 302c.

In step 504, the third external interface unit 302c forwards the packet to the external network element.

The following describes a registration and deregistration process of a processing unit.

When performance expansion is required, for a processing unit with an insufficient processing capability, for example, a processing unit for implementing antivirus processing, the number of nodes of the processing units with the same function may be increased. In addition, when function extension is required, a new type of processing units, for example, a processing unit of a security audit or content filtering device, need to be added, and this type of devices does not exist in the preceding distributed cluster system 300. In the foregoing case, the added processing unit node registers with the switching unit, and the switching unit allocates a node token ID for the added processing unit node. After the registration is successful, the switching unit broadcasts to all the other units to notify them of the newly added node.

In a case that a processing unit with the same function is added, the switching unit performs comprehensive analysis according to conditions such as a node processing capability, quantity, and a load level of the same type of processing units, determines a weight for each of such type of nodes, and provides related information for other processing units. In this way, when determining that the lower-level processing is performed by multiple processing units with the same function, the upper-level processing unit may evenly allocate, according to weight information, the session to the processing units in a load balancing manner, thereby implementing performance and capacity expansion processing of the entire system.

Figure 7:
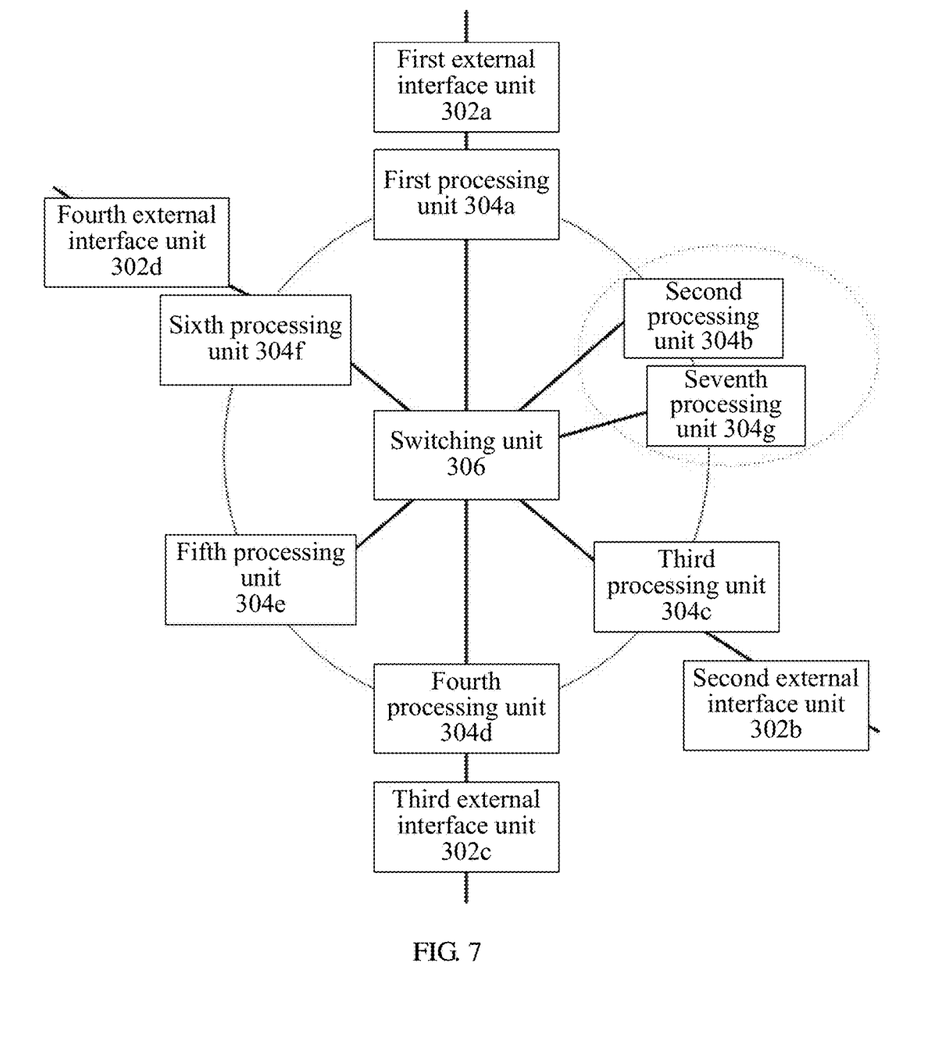
FIG. 7 is a schematic diagram for describing registration (performance expansion) of a processing unit according to an implementation manner of the present invention.
Figure 8:
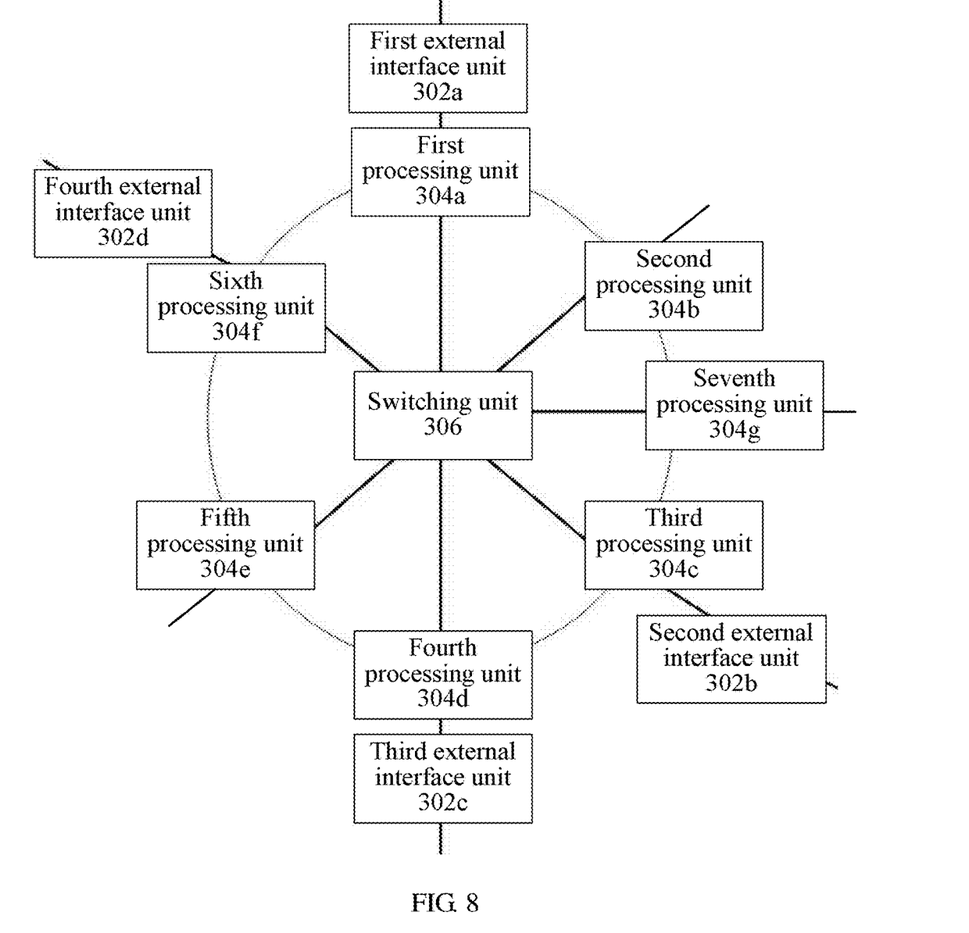
FIG. 8 is a schematic diagram for describing registration (function extension) of a processing unit according to an implementation manner of the present invention.

FIG. 7 is a schematic diagram for describing registration, that is, performance expansion, of a processing unit according to an implementation manner of the present invention. FIG. 8 is a schematic diagram for describing registration (function extension) of a processing unit according to an implementation manner of the present invention.

When performance expansion is required, for a processing unit with an insufficient processing capability, for example, a processing unit for antivirus processing, the number of nodes of the processing units with the same function may be increased. The following describes a registration process in a case of performance expansion with reference to FIG. 7.

First, a new seventh processing unit 304g is added in the system. The seventh processing unit 304g notifies a switching unit 306 of a device type, a processing capability, and the like of the seventh processing unit 304g, registers with the switching unit 306, and applies for a token. The seventh processing unit 304g obtains, from the switching unit 306, information such as a type, a capability, a token ID, and the like of other processing units in the system, and establishes a first processing unit list of the seventh processing unit 304g.

Second, the switching unit 306 broadcasts the device type, the processing capability, the token ID, and the like of the seventh processing unit 304g to all registered processing units 304a-304f, and the other registered processing units 304a-304f record the new seventh processing unit 304g. In addition, the switching unit 306 performs comprehensive analysis on a processing capability, a load level, and the like of the second processing unit 304b and the seventh processing unit 304g, allocates weights for the second processing unit 304b and the seventh processing unit 304g, and broadcasts related weight information to other processing units, so that the other processing units perform even load balancing when sending a session to this type of processing units, so as to meet an expansion requirement.

In addition, the original first to sixth processing units 304a-304f update first processing unit lists stored by themselves.

In a case that function extension is required, a new type of processing units needs to be added, for example, a security audit or content filtering device, and this type of devices does not exist in the preceding distributed cluster system. The following describes a registration process in a case of function extension.

First, in a case that a processing unit with a new function, for example, a content filtering system, needs to be added according to planning of a user, a new seventh processing unit 304g' supporting content filtering is added, since a processing unit capable of implementing a content filtering function does not exist in the current system. In this case, the seventh processing unit 304g' notifies a switching unit 306 of a device type, a processing capability, and the like of the seventh processing unit 304g', registers with the switching unit 306, and applies for a token. In addition, the seventh processing unit 304g' obtains, from the switching unit 306, information such as a type, a capability, a token ID, and the like of other processing units in the system, and establishes a first processing unit list of the seventh processing unit 304g'.

Second, the switching unit 306 broadcasts the device type, the processing capability, the token ID, and the like of the seventh processing unit 304g' to all registered processing units 304a-304f, and the other registered processing units 304a-304f record the new seventh processing unit 304g'.

In addition, the original first to sixth processing units 304a-304f update first processing unit lists stored by themselves, update a session processing policy, and set a type of a session requiring content filtering and processing capabilities of themselves.

In addition, in a case that a processing unit (for example, the fifth processing unit 304e) node is deleted from the system, the fifth processing unit 304e to be deleted broadcasts deregistration information of itself to all the other units including the switching unit 306, and the other units delete information about the fifth processing unit 304e from processing unit lists of themselves.

In addition, the switching unit 306 further periodically detects all the processing units 306a-306f in the system, and when finding that a processing unit (for example, the fifth processing unit 304e) is disconnected, broadcasts information that the fifth processing unit 304e is invalid to other processing units in the system. The other processing units delete information about the fifth processing unit 304e from first processing unit lists of themselves, and update, according to a function of the fifth processing unit 304e, the session processing policy.

In addition, when the deleted fifth processing unit 304e is one of multiple processing units with the same function, the switching unit 306 further needs to calculate a weight again and broadcasts it to other processing units in the system.

It should be noted that the above implementation manners and embodiments are provided merely for describing objectives of the technical solutions of the present invention, and the present invention is not limited thereto. It should be understood by a person skilled in the art that although the present invention has been described in detail with reference to the above implementation manners and embodiments, modifications may be made to the technical solutions described in the above implementation manners and embodiments, or equivalent replacements may be made to some technical features in the technical solutions; and the corresponding technical solutions on which the modifications or replacements are made do not depart from the spirit and scope of the technical solutions of the implementation manners and embodiments described in the present invention in nature.

What is claimed is:

1. A distributed cluster processing system connected to at least one external network element, comprising:
   multiple processors;
   at least one external interface, each directly connected to a corresponding processor among the multiple processors; and
   at least one intelligent switch;
   wherein:
   each of the at least one external interface is connected between the corresponding processor and a connected external network element, and is configured to receive an external packet from the connected external network element, forward the external packet to the corresponding processor directly connected thereto, and send a completely processed packet to the connected external network element;
   each of the multiple processors is configured to perform at least one of security and value-added service processing and is respectively connected to the at least one intelligent switch, so that the multiple processors and the at least one intelligent switch form a star topology structure;
   each of the multiple processors is further configured to receive an internal packet from the at least one intelligent switch or the external packet from a corresponding external interface directly connected thereto, perform the at least one of security and value-added service processing on the internal or external packet to obtain a processed packet, determine lower-level service processing and determine a lower-level processor according a session processing policy, add a tag containing information about the lower-level processor in the processed packet and send the processed packet to the at least one intelligent switch, and upon determining that all processing on the processed packet has been completed, send the completely processed packet to one of the at least one external interface; and
   the at least one intelligent switch is configured to receive packets from the multiple processors, forward, according to the tag containing the information about the lower-level processor added in the packets, each of the packets to the lower-level processor among the multiple processors indicated by the information about the lower-level processor, and return the packets processed by the lower-level processor to the at least one external interface.

2. The distributed cluster processing system according to claim 1, wherein the tag containing the information about the lower-level processor includes a destination token indicating an identity of the lower-level processor and a source token indicating an identity of a current-level processor.

3. The distributed cluster processing system according to claim 2, wherein the number of destination tokens may be one or more.

4. The distributed cluster processing system according to claim 1, wherein each of the multiple processors is further configured to
   establish a local session table containing information processed by a receiving processor when receiving the packet; and
   in a case that a received session table related to the packet is received from an upper-level processor, not repeatedly perform processing recorded in the received session table, and further copy information in the received session table from the upper-level processor to the local session table.

5. The distributed cluster processing system according to claim 1, wherein:
   the at least one intelligent switch is further configured with a first list of processor information about each of the multiple processors and weight information of similar processors with a same function; and
   each of the multiple processors is further configured with a second list of the processor information about other processors in the system and the weight information of the similar processors with the same function, and determine the lower-level processor according to the second list.

6. The distributed cluster processing system according to claim 5, wherein: the at least one intelligent switch is further configured to, when a new processor is added in the distributed cluster processing system, receive registration information and a token application from the new processor, allocate a token to the new processor, broadcast the registration information and the token of the new processor to the other processors in the distributed cluster processing system, and provide registration information and tokens of the other processors in the distributed cluster processing system for the new processor.

7. The distributed cluster processing system according to claim 6, wherein: the at least one intelligent switch is further configured to, when a function of the new processor is the same function as that of at least one similar processor among the multiple processors, perform comprehensive analysis according to processing capability information, quantity, and a load level of the at least one similar processor with the same function, provide a weight for each of the at least one similar processor with the same function, and broadcast the weight to the other processors.

8. The distributed cluster processing system according to claim 6, wherein:
each of the multiple processors is further configured to update the session processing policy according to the function of the new processor, when receiving the registration information and the token of the new processor from the at least one intelligent switch.

9. The distributed cluster processing system according to claim 5, wherein: the at least one intelligent switch is further configured to
periodically check each of the multiple processors in the distributed cluster processing system; and
when an invalid processor is deleted from the distributed cluster processing system or is found disconnected in the check, broadcast invalidity information about the invalid processor to the other processors in the distributed cluster processing system, and the other processors delete the information about the invalid processor from the second list of each remaining processor; and update the session processing policy according to the function of the invalid processor.

10. The distributed cluster processing system according to claim 9, wherein: when the invalid processor belongs to the similar processors with the same function among the multiple processors, the at least one intelligent switch further performs comprehensive analysis according to processing capability information, quantity, and a load level of the similar processors with the same function after deletion of the invalid processor, provides a weight for each of the similar processors with the same function, and broadcasts the weight to the other processors.

11. The distributed cluster processing system according to claim 1, wherein:
the at least one external interface is a line processor of a router or a gateway device with a routing function;
the multiple processors are independent servers, or boards or subboards of the router; and
the at least one intelligent switch is an independent switching chassis or a switch fabric of the router.

12. A packet processing method for a distributed cluster processing system, wherein the distributed cluster processing system comprises at least one external interface unit, multiple processing units, and at least one switching unit, wherein:
each of the at least one external interface unit is connected between a corresponding processing unit of the multiple processing units and an external network element;
each of the multiple processing units performs at least one of security and value-added service processing and is respectively connected to the switching unit, so that the multiple processing units and the switching unit form a star topology structure; and
the method comprises:
a first step: receiving, by one of the at least one external interface unit, a packet from the external network element, and forwarding the packet to the processing unit directly connected to the external interface unit;
a second step: receiving, by one or more of the multiple processing units, a packet from the switching unit or the packet from the directly connected external interface unit, performing the at least one of security and value-added service processing on the packet, determining lower-level service processing and determining a lower-level processing unit according to a session processing policy, and if it is determined that all processing on the packet has been completed, sending the packet to one of the at least one external interface unit; otherwise, adding a tag containing information about the lower-level processing unit in the processed packet and sending the processed packet to the switching unit;
a third step: receiving, by the switching unit, a packet from each of the multiple processing units, and forwarding, according to the tag containing the information about the lower-level processing unit and added in the received packet, the packet to a processing unit among the multiple processing units that is indicated by the information about the lower-level processing unit;
a fourth step: returning the packet processed by the lower-level processor to the processing unit directly connected to the one of the at least one external interface unit; and
a fifth step: receiving, by the one of the at least one external interface unit, the packet from the processing unit directly connected to the one of the at least one external interface unit, and forwarding the packet to the external network element.

13. The method according to claim 12, wherein the tag containing the information about the lower-level processing unit comprises a destination token indicating an identity of the lower-level processing unit and a source token indicating an identity of a current-level processing unit.

14. The method according to claim 13, wherein the number of destination tokens may be one or more.

15. The method according to claim 12, wherein in the second step, the processing unit establishes a local session table containing information processed by the processing unit when receiving the packet; when receiving a session table related to the packet from the upper-level processing unit, does not repeatedly perform processing recorded in the received session table; and further copies information in the session table from the upper-level processing unit to the local session table.

16. The method according to claim 12, wherein:
the switching unit stores information about each processing unit in the distributed cluster processing system and weight information of processing units with the same function in a second processing unit list of the switching unit;
each of the multiple processing units stores information about other processing units in the distributed cluster processing system and the weight information of the processing units with the same function in first processing unit lists of themselves; and
in the fourth step, each of the multiple processing units determines the lower-level processing unit according to the first processing unit lists of themselves.

17. The method according to claim 16, further comprising: a sixth step: when a new processing unit is added in the system, receiving, by the switching unit, registration information and a token application from the new processing unit, allocating a token to the new processing unit, broadcasting the registration information and the token of the new processing unit to other processing units in the system, and providing registration information and tokens of other processing units in the system for the new processing unit.

18. The method according to claim 17, wherein: in the sixth step, when a function of the new processing unit is the same as that of one or more processing units of the multiple processing units, the switching unit performs comprehensive analysis according to information of a processing capability, quantity, and a load level of the processing units with the same function, provides a weight for each of the processing units with the same function, and broadcasts the weight to the other processing units.

19. The method according to claim 17, wherein: in the sixth step, each of the processing units updates the session processing policy according to the function of the new processing unit when receiving the registration information and the token of the new processing unit and from the switching unit.

20. The method according to claim 16, further comprising: a seventh step: periodically checking, by the switching unit, each processing unit in the system; and when a processing unit is deleted from the distributed cluster processing system or finding that a processing unit is disconnected in the check, broadcasting information that the disconnected processing unit is invalid to other processing units in the distributed cluster processing system, and the other processing units delete the information about the invalid processing unit from the first processing unit lists of themselves, and update the session processing policy according to a function of the invalid processing unit.

21. The method according to claim 20, wherein: in the seventh step, when the invalid processing unit belongs to the multiple processing units with the same function among the multiple processing units, the switching unit further performs comprehensive analysis according to the information of a processing capability, quantity, and a load level of the processing units with the same function after the deletion, provides a weight for each of the processing units with the same function, and broadcasts the weight to the other processing units.

22. The method according to claim 12, wherein: each of the at least one external interface unit is a line processing unit of a router or a gateway device with a routing function, each of the multiple processing units is an independent server, or a board or a subboard of a router, and the switching unit is an independent switching chassis or a switch fabric unit of a router.

* * * * *